United States Patent [19]

Takahashi

[11] Patent Number: 5,069,529
[45] Date of Patent: Dec. 3, 1991

[54] PORTABLE DISPLAY EQUIPMENT

[75] Inventor: Kotaro Takahashi, Kiyose, Japan

[73] Assignee: Citizen Watch Co., Ltd., Tokyo, Japan

[21] Appl. No.: 519,097

[22] Filed: May 4, 1990

[30] Foreign Application Priority Data

May 26, 1989 [JP] Japan .............................. 1-60396[U]

[51] Int. Cl.$^5$ ........................ G02B 27/00; H04N 5/72
[52] U.S. Cl. .................................. 359/601; 358/252; 359/817
[58] Field of Search ................... 350/276 R, 284, 319, 350/250; 358/245, 247, 250, 252

[56] References Cited

U.S. PATENT DOCUMENTS

| 3,001,015 | 9/1961 | Weiss | 358/252 |
| 3,109,063 | 10/1963 | Parker | 358/252 |
| 4,208,676 | 6/1980 | Berwick et al. | 358/250 |
| 4,478,498 | 10/1984 | Ohno | 350/250 |
| 4,773,747 | 9/1988 | Bresnahan | 350/250 |
| 4,784,468 | 11/1988 | Tierney | 350/276 R |
| 4,846,553 | 7/1989 | Rice | 350/250 |
| 4,864,190 | 9/1989 | Orr | 358/252 |
| 4,865,420 | 9/1989 | Schmidt | 350/276 R |

Primary Examiner—Scott J. Sugarman
Assistant Examiner—Loha Ben
Attorney, Agent, or Firm—Rogers, Howell & Haferkamp

[57] ABSTRACT

A portable display equipment includes an image display unit, and an external light preventing member of a polygonal cylinder. The external light preventing member is detachably mounted in front of the display portion of the image display unit. The external light preventing member includes a shielding member and a light-shielding member of a polygonal cylinder. The shielding member covers the periphery of the display portion of the image display unit. The light-shielding member consists of a plurality of light-shielding plates which are coupled to each other so as to be freely bent and constitute one sheet member when developed. The light-shielding member is narrowed toward the viewer side by bending coupling portions of the light-shielding plates. The shielding member is coupled to part of an edge of the light-shielding member on the display side so as to be freely bent.

7 Claims, 3 Drawing Sheets

PORTABLE DISPLAY EQUIPMENT

BACKGROUND OF THE INVENTION

1. Field of the Invention

The present invention relates to a portable display equipment, such as a liquid crystal TV, on which an external light preventing member can be detachably mounted.

2. Description of the Prior Art

When a conventional portable TV or the like is used under the sunlight or in a bright place, light is reflected by a protective glass arranged on the front surface of the TV, and, in many cases, no images on the screen can be seen. For this reason, with the spread of portable TVs, the number of TVs having external light preventing hoods as accessories has been increased. As TVs are increasingly used outdoors, prevention of external light is increasing in importance. For example, a portable TV hood constituted by about six components is currently available. The external light preventing effect of such a hood, however, is not sufficient in spite of the cost, thus posing problems in practical applications. Hoods of various forms are available. They can be roughly classified into two types. One is designed to shield light in three directions (upper and both sides) of an image display portion. The other is formed into a cylindrical shape so as to shield light in four directions (upper, lower, left, and right sides) of an image display portion, as disclosed in, e.g., Japanese Utility Model Laid-Open No. 55-39745 and U.S. Pat. No. 4,865,420. A hood of the type for shielding light in only the three directions is effective for weak light such as fluorescent light but is almost useless for outdoor use. There are various types of cylindrical hoods, e.g., a hood which is designed such that the opening on the viewer side is wider than the opening on the TV main body, and a hood whose openings on both the sides have substantially the same size. It is easier for a viewer to see images through a cylindrical hood whose opening becomes large in size toward the viewer than through other types of cylindrical hoods. In using such a hood, however, the possibility of entrance of external light is increased, and hence a sufficient external light preventing effect cannot be obtained outdoors. In addition, hoods vary in size. Since large hoods are not easy to use, a demand has arisen for smaller hoods. However, it is not possible to completely shield external light regardless of the sizes of hoods as long as they have openings. Therefore, no hoods can prevent reflection by a protective glass.

SUMMARY OF THE INVENTION

It is an object of the present invention to provide an external light preventing member, which can prevent the influences of external light on images in any outdoor conditions, especially allows satisfactory use of a video camera in practical applications even in outdoor photography, can be easily mounted on a display equipment main body, has excellent portability, and can be constituted by a low-cost means.

DETAILED DESCRIPTION OF THE PREFERRED EMBODIMENT

The present invention will be described below with reference to the accompanying drawings.

Figure 1:
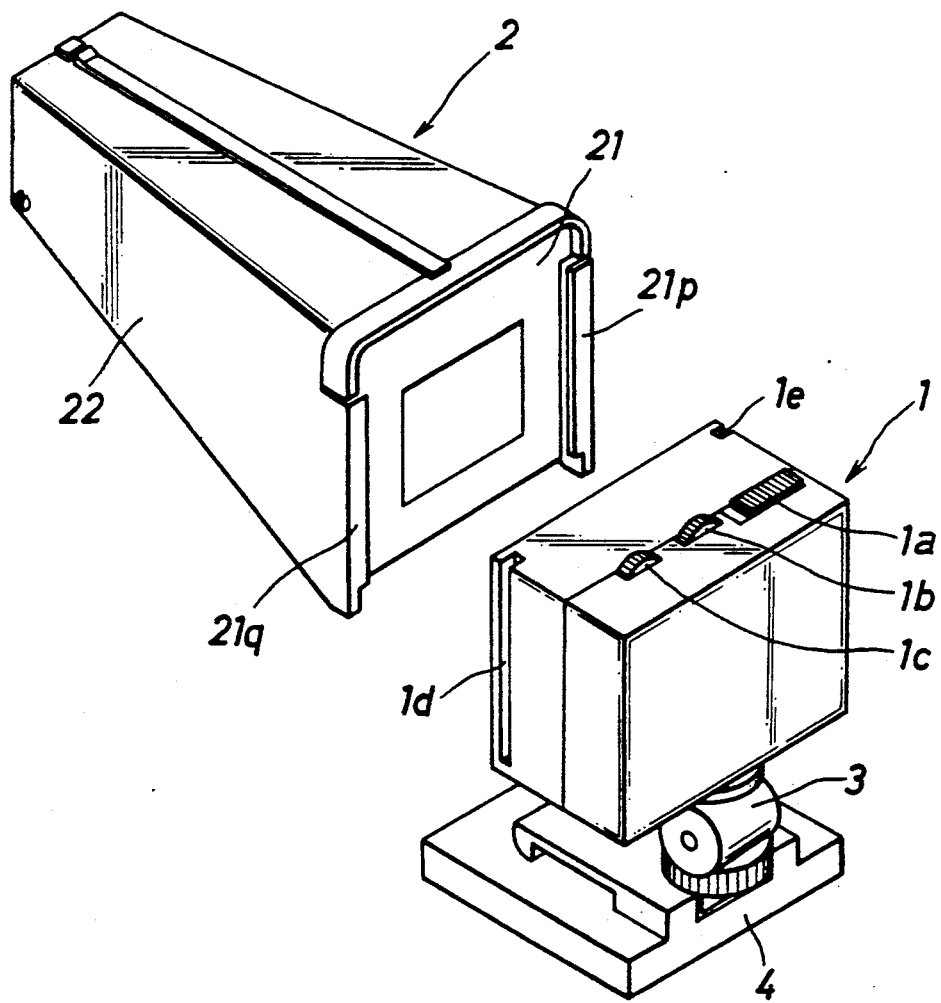
FIG. 1 is a perspective view showing a portable display equipment from which an external light preventing member is detached.

FIG. 1 shows a state wherein a portable display equipment of the present invention is used as a stationary type equipment. The portable display equipment comprises a display equipment main body 1, and an external light preventing member 2 to be mounted on the front surface of the main body 1. The display equipment main body 1 is mounted on a power source box 4 through a connecting member 3. A power source switch 1a, a luminance level adjusting dial 1b, and a volume adjusting dial 1c are arranged on the upper surface of the main body 1.

The external light preventing member 2 comprises a shielding member 21 to be brought into tight contact with the front surface of the display equipment main body 1, and a box-like light-shielding member 22 extending backward from the periphery of the shielding member 21.

Figure 2:
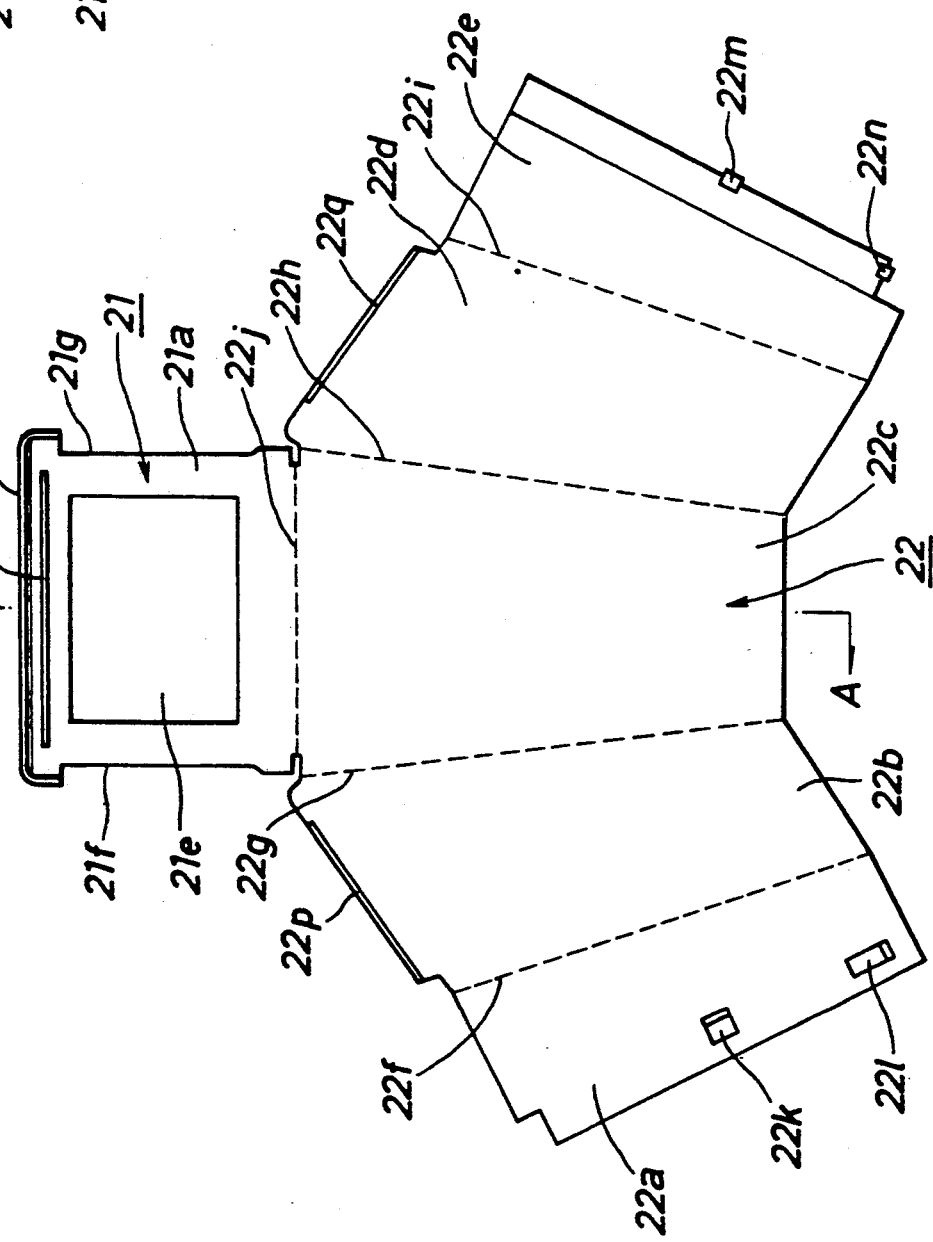
FIG. 2A is a developed view showing an external light preventing member of an embodiment which is to be mounted on the portable display equipment.
FIG. 2B is a sectional view taken along a line A—A in FIG. 2A.
Figure 3:
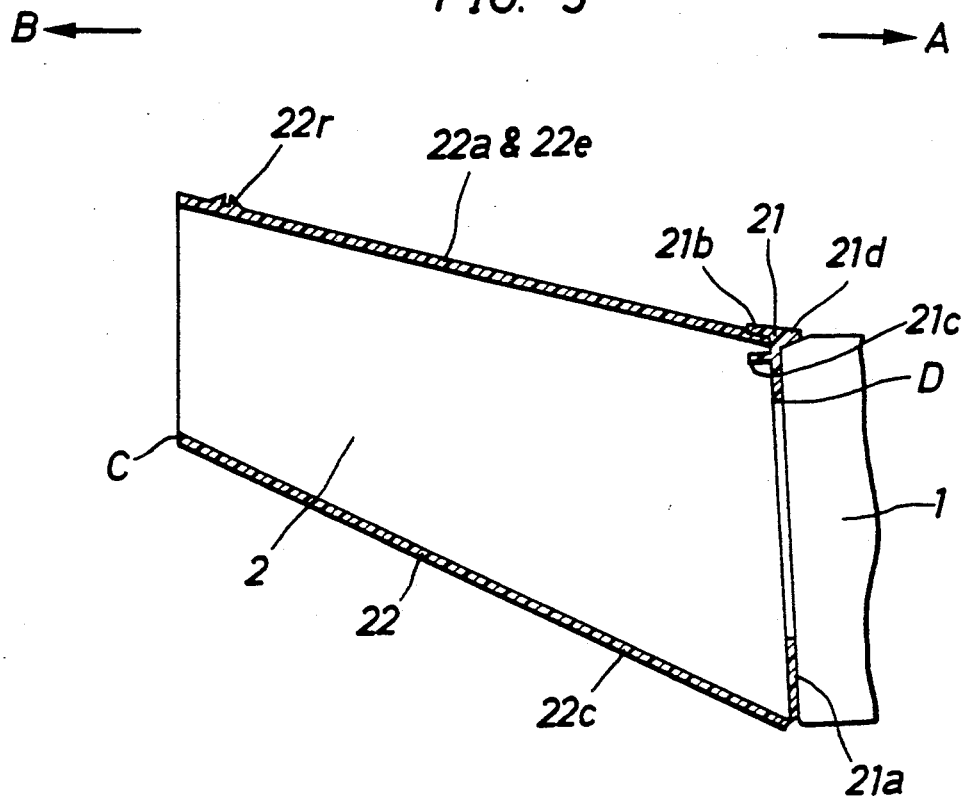
FIG. 3 is a sectional view showing the assembled external light preventing member.
Figure 4:
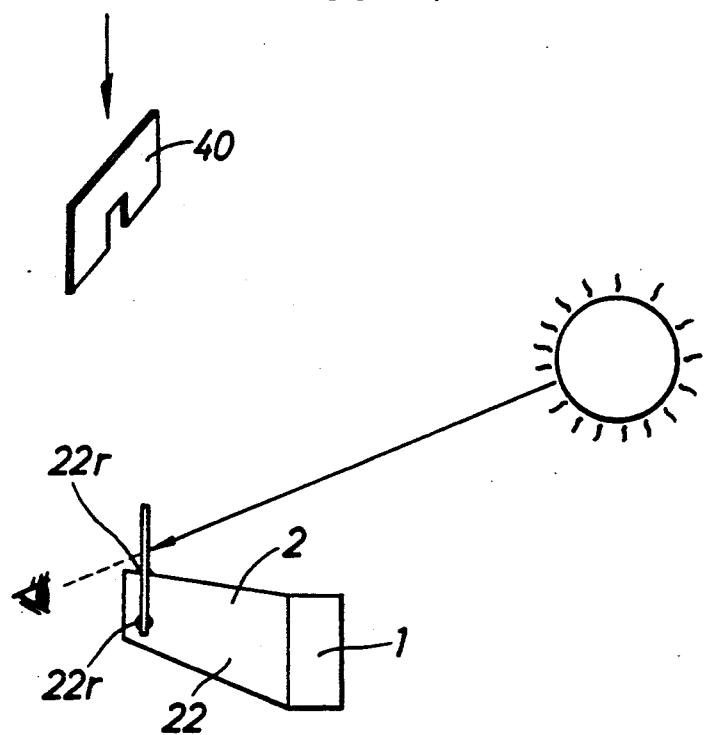
FIG. 4 is a view for explaining a manner of using the external light preventing member.

FIG. 2A is an exploded view of the external light preventing member 2. The light-shielding member 22 is constituted by light-shielding elements 22a, 22b, 22c, 22d, and 22e which are integrally formed with each other to be freely bent through bending portions 22f, 22g, 22h, and 22i. The light-shielding elements 22a and 22e respectively have fixing holes 22k and 22l and fixing pawls 22m and 22n which are used to assemble the light-shielding member 22. When the bending portions 22f, 22g, 22h, and 22i are bent, and the fixing pawls 22m and 22n are respectively set in the fixing holes 22k and 22l, a cylindrical body is formed. The shielding member 21 comprises: a shielding portion 21a which is integrally formed with the light-shielding element 22c of the light-shielding member 22 so as to be freely bent through a bending portion 22j; a holding portion 21b for holding sides of the light-shielding elements 22a and 22e and portions of sides of the light-shielding elements 22b and 22d; a supporting portion 21c for preventing the light-shielding elements 22a and 22e from falling inward; a lock portion 21d serving as a stopper when the shielding member 21 is set on the main body; and a display hole 21e, formed slightly above the main body, for allowing images to be seen therethrough. When the bending portion 22j is bent to cause the shielding member 21 to be brought into contact with the light-shielding elements 22a and 22e, the periphery of the cylindrical light-shielding member 22 is held by the holding portion 21b, thus completing the external light preventing member. Protrusions 22p and 22q for mounting the external light preventing member 2 on the main body 1 as a portable display equipment are arranged on the light-shielding elements 22b and 22d defining the sides of the completed external light preventing member 2. The shielding portion 21a is arranged to be in contact with the display surface of the main body 1. Notches 21f and 21g are formed in the shielding portion 21a so as to prevent the shielding portion 21a from interfering with the protrusions 22p and 22q when the light-shielding elements are to bent. However, while the external light preventing member 2 is set on the main body 1, the influences of external light are prevented by the protrusions 22p and 22q, which shield external light. As shown in FIG. 3, an arrow A indicates the side on which the main body 1 is to be set, and an arrow B indicates the viewer side. The cylindrical body is gradually narrowed toward the viewer side, and is formed into a substantially quadrangular prism as a whole. The height position of a lower end C of the opening on the viewer side is raised to be matched with an upper end D of the image display portion of the main body 1. For this reason, the display hole 21e is set at the position above the display portion of the main body 1. As shown in FIG. 1, mounting grooves 1d and 1e are formed in the side surfaces of the main body 1. The grooves 1d and 1e extend to lower portions of the side surfaces and are designed to prevent insertion from below. The assembled external light preventing member 2 is mounted on the main body 1 in such a manner that the protrusions 22p and 22q are respectively slid along the grooves 1d and 1e until the lock portion 21d is brought into contact with the upper surface of the main body 1, thereby completing setting. In this state, the shielding member 21 is clamped and held between the light-shielding member 22 and the main body 1. Note that the member of the present invention is made of a black molding material (e.g., polyproprene mixed with a black pigment). Especially, the inner surface of the member is subjected to embossing (roughening) using a die in order to obtain a reflection preventing effect. In addition, as indicated in an application example shown in FIG. 4, three insertion portions 22r in which a plate 40 for shielding sunlight during backlight photography are formed on the distal end and both the surfaces of the light-shielding element 22a or 22e. According to the embodiment of the present invention, since the external light preventing member is made of a black molding material, the entire display equipment is formed in black except for the image display portion. This allows a viewer to more easily see images on the display portion. In addition, since the cylindrical body is narrowed toward the distal end, the influences of external light can be reduced. Therefore, the cylindrical body can be shortened, and an easy-to-use, small-size external light preventing member can be obtained. Since the opening of the external light preventing member is set at the position above the image display portion, the face of a viewer is not reflected in images. This allows the viewer to easily see images. If the preferential direction of vision of a liquid crystal is aligned with the direction of 12 o'clock, a viewer can enjoy images under optimal conditions. The external light preventing member can be easily mounted on the display equipment main body 1 by the sliding scheme. In addition, since the member is integrally formed, no components are lost or forgotten to be carried. That is, the member is excellent in portability. Moreover, during backlight photography, the phenomenon that a viewer is dazzled by sunlight and can see only dark images can be prevented by mounting a plate for shielding sunlight on the external light preventing member. Therefore, when the main body 1 is to be used as a monitor during photography by a video camera, the external light preventing member is very effective.

According to the present invention, the influences of external light can be reduced by the light-shielding member which is formed into a substantially quadrangular prism having one opening narrowed toward the viewer side. In addition, the shielding member for covering reflecting surfaces except for the image display portion, exterior coatings, and colored surfaces such as print surfaces can prevent the drawback that a viewer is dazzled by external light or light emitted from the image display portion of the display equipment which is reflected by the reflecting surfaces, the colored surfaces, and the like, and cannot see images clearly. In addition, since the external light preventing member of the present invention is integrally formed, leakage of light through the member can be almost completely prevented, unlike a conventional one constituted by a large number of components, in which light leaks from connecting portions. Moreover, the external light preventing member of the present invention can be provided at a low cost.

What is claimed is:

1. A portable display equipment comprising an image display unit, and an external light preventing member of a polygonal cylinder detachably mounted in front of a display portion of said image display unit, said external light preventing member including:
    a shielding member for covering a periphery of the display portion of said image display unit, and a light-shielding member of a polygonal cylinder consisting of a plurality of light-shielding plates which are coupled to each other so as to be freely bent and constitute one sheet member when developed, said light-shielding member being narrowed toward a viewer side by bending coupling portions of said light-shielding plates, wherein
    said shielding member is coupled to part of an edge of said light-shielding member on a display side thereof so as to be freely bent.

2. An equipment according to claim 1, wherein elongated grooves are formed in side surfaces of said image display unit, and engaging portions are formed on said external light preventing member so as to be slid along the grooves and to couple said external light preventing member to said image display unit.

3. An equipment according to claim 2, wherein said engaging portions are formed on an edge of said light-shielding member on the display side so as to protrude further toward the display portion than said shielding member, and are designed in such a manner that when said engaging portions are engaged with the grooves of said image display unit, said shielding member is urged by a front surface of the display portion against said light-shielding member so as to be integrally coupled thereto.

4. An equipment according to claim 1, wherein said plurality of light-shielding plates, and said shielding member are integrally formed by a plastic material and coupled to each other, and each coupling portion therebetween is formed to have a smaller thickness than those of said light-shielding member and said shielding member.

5. An equipment according to claim 1, wherein said light-shielding member comprises
    a bottom light-shielding plate constituting a bottom of said polygonal cylinder,
    side light-shielding plates respectively coupled to both sides of said bottom light-shielding plate so as to constitute side surfaces of said polygonal cylinder, and a top light-shielding plate coupled to sides of said side light-shielding plates, said top light-shielding plate being engaged with said side light-shielding plates so as to constitute a top surface of said polygonal cylinder, and said shielding member is coupled to said bottom light-shielding plate at an edge on the display side thereof, and is designed to be freely engaged with said top light-shielding plate at an edge on the display side thereof.

6. An equipment according to claim 1, wherein said light-shielding member has a black inner surface.

7. An equipment according to claim 1, wherein a light-shielding engaging portion is formed near an opening of said light-shielding member.

* * * * *